(12) United States Patent
Miller et al.

(10) Patent No.: US 10,164,433 B2
(45) Date of Patent: Dec. 25, 2018

(54) ADJUSTING ELECTRIFIED VEHICLE OPERATION TO BALANCE ELECTRICAL GRID

(71) Applicant: FORD GLOBAL TECHNOLOGIES, LLC, Dearborn, MI (US)

(72) Inventors: Kenneth James Miller, Canton, MI (US); Douglas Raymond Martin, Canton, MI (US); Jimmy Kapadia, Ottawa Hills, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 186 days.

(21) Appl. No.: 15/000,312

(22) Filed: Jan. 19, 2016

(65) Prior Publication Data

US 2017/0207626 A1   Jul. 20, 2017

(51) Int. Cl.
| | |
|---|---|
| H02J 1/16 | (2006.01) |
| H02J 3/06 | (2006.01) |
| H02J 3/00 | (2006.01) |
| H02J 3/32 | (2006.01) |
| H02J 13/00 | (2006.01) |

(52) U.S. Cl.
CPC .............. *H02J 3/06* (2013.01); *H02J 3/005* (2013.01); *H02J 3/32* (2013.01); *H02J 13/0075* (2013.01); *H02J 2003/001* (2013.01); *Y02B 90/2653* (2013.01); *Y02E 60/722* (2013.01); *Y02E 60/7853* (2013.01); *Y04S 10/14* (2013.01); *Y04S 40/126* (2013.01)

(58) Field of Classification Search
CPC ...... H01M 4/625; Y02E 60/122; B60W 10/08
See application file for complete search history.

(56) References Cited

U.S. PATENT DOCUMENTS

| | | | |
|---|---|---|---|
| 7,849,944 | B2 | 12/2010 | DeVault |
| 2007/0282495 | A1 | 12/2007 | Kempton et al. |
| 2008/0308328 | A1 | 12/2008 | Kejha |
| 2011/0047052 | A1 | 2/2011 | Cornish |
| 2011/0166731 | A1 | 7/2011 | Kristinsson et al. |
| 2012/0123709 | A1 | 5/2012 | Chen et al. |
| 2013/0204471 | A1 | 8/2013 | O'Connell et al. |
| 2013/0241485 | A1* | 9/2013 | Snyder ............... B60L 11/1809 320/109 |
| 2014/0081563 | A1 | 3/2014 | Wang et al. |
| 2015/0097512 | A1 | 4/2015 | Li et al. |
| 2016/0186674 | A1* | 6/2016 | Umesaka ............... F02D 29/02 701/22 |

* cited by examiner

Primary Examiner — Sibin Chen
(74) Attorney, Agent, or Firm — Carlson, Gaskey & Olds

(57) ABSTRACT

A method for balancing electrical grid production with electrical grid demand, according to an exemplary aspect of the present disclosure includes, among other things, adjusting operation of an engine of an electrified vehicle during a drive event to either conserve a state of charge of a battery pack in response to a first grid condition of an electrical grid or deplete the state of charge of the battery pack in response to a second grid condition of the electrical grid.

21 Claims, 5 Drawing Sheets

ADJUSTING ELECTRIFIED VEHICLE OPERATION TO BALANCE ELECTRICAL GRID

TECHNICAL FIELD

This disclosure relates to a vehicle system and method for an electrified vehicle. The vehicle system is adapted to adjust operation of an electrified vehicle in a manner that assists in balancing the energy production of an electrical grid with the energy demand from the electrical grid.

BACKGROUND

The need to reduce automotive fuel consumption and emissions is well known. Therefore, vehicles are being developed that reduce reliance on internal combustion engines. Electrified vehicles are one type of vehicle currently being developed for this purpose. In general, electrified vehicles differ from conventional motor vehicles because they are selectively driven by one or more battery powered electric machines and may have additional power sources such as an internal combustion engine. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that must be periodically recharged. The energy necessary for recharging the battery cells is commonly sourced from an electrical grid. The electrical grid includes an interconnected network of generating stations (coal, gas, nuclear, chemical, hydro, solar, wind, etc.), demand centers and transmission lines that produce and deliver electrical power to consumers. Energy production of the electrical grid must be constantly balanced against the energy demand from the consumers.

SUMMARY

A method for balancing electrical grid production with electrical grid demand, according to an exemplary aspect of the present disclosure includes, among other things, adjusting operation of an engine of an electrified vehicle during a drive event to either conserve or increase a state of charge of a battery pack in response to a first grid condition of an electrical grid or deplete the state of charge of the battery pack in response to a second grid condition of the electrical grid.

In a further non-limiting embodiment of the foregoing method, the first grid condition is an energy shortage of the electrical grid and the second grid condition is an energy surplus of the electrical grid.

In a further non-limiting embodiment of either of the foregoing methods, the method includes adding power from the battery pack to the electrical grid at next plug event if the electrical grid has the energy shortage.

In a further non-limiting embodiment of any of the foregoing methods, the method includes accepting power from the electrical grid to charge the battery pack at next plug event if the electrical grid has the energy surplus.

In a further non-limiting embodiment of any of the foregoing methods, the method includes communicating vehicle data to the electrical grid prior to the adjusting step, the first grid condition and the second grid condition determined at least partially based on the vehicle data.

In a further non-limiting embodiment of any of the foregoing methods, the first grid condition and the second grid condition are additionally determined based at least on a weather forecast.

In a further non-limiting embodiment of any of the foregoing methods, the method includes confirming whether a wireless grid signal has been received by the electrified vehicle from the electrical grid.

In a further non-limiting embodiment of any of the foregoing methods, the method includes determining whether the wireless grid signal indicates an energy shortage or an energy surplus.

In a further non-limiting embodiment of any of the foregoing methods, if the wireless grid signal indicates an energy shortage, the adjusting step includes increasing a power output of the engine or increasing a run time of the engine during the drive event.

In a further non-limiting embodiment of any of the foregoing methods, the method includes adding energy from the battery pack to the electrical grid at next plug event to address the energy shortage.

In a further non-limiting embodiment of any of the foregoing methods, if the wireless grid signal indicates an energy surplus, the adjusting step includes decreasing a power output of the engine or decreasing a run time of the engine during the drive event.

In a further non-limiting embodiment of any of the foregoing methods, the method includes charging the battery pack using energy from the electrical grid at next plug event.

In a further non-limiting embodiment of any of the foregoing methods, the method includes actuating the engine ON during the drive event in response to an energy shortage condition of the electrical grid.

In a further non-limiting embodiment of any of the foregoing methods, the method includes decreasing a power output of the engine or decreasing a run time of the engine during the drive event in response to an energy surplus condition of the electrical grid.

In a further non-limiting embodiment of any of the foregoing methods, the electrified vehicle is a plug-in hybrid electric vehicle.

An electrified vehicle according to another exemplary aspect of the present disclosure includes, among other things, a set of drive wheels, a battery pack configured to selectively power the drive wheels, an engine configured to selectively power the drive wheels and a control system configured with instructions for adjusting operation of the engine during a drive event in a manner that balances an electrical grid.

In a further non-limiting embodiment of the foregoing electrified vehicle, the control system is configured to receive a wireless grid signal from the electrical grid, the wireless grid signal including the instructions.

In a further non-limiting embodiment of either of the foregoing electrified vehicles, a charging system is configured to connect the battery pack to the electrical grid.

In a further non-limiting embodiment of any of the foregoing electrified vehicles, the control system is configured to run the engine during an energy shortage condition of the electrical grid and restrict operation of the engine during an energy surplus condition of the electrical grid.

In a further non-limiting embodiment of any of the foregoing electrified vehicles, the control system includes a transceiver configured to communicate with the electrical grid over a cloud.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a vehicle system for controlling an electrified vehicle to balance an electrical grid. An exemplary control strategy includes adjusting engine operation of the electrified vehicle in a manner that either conserves a state of charge (SOC) of a battery pack or depletes the SOC of the battery pack during a drive event. In some embodiments, if the electrical grid has an energy shortage, the engine of the electrified vehicle is turned ON more frequently or the engine power is increased greater than the required drive power during the drive event. The battery pack SOC is therefore either conserved or increased during the drive event for adding energy to the electrical grid during a subsequent plug event. In other embodiments, operation of the engine of the electrified vehicle is restricted during the drive event if the electrical grid has an energy surplus. The battery pack SOC is therefore depleted during the drive event and can be replenished by accepting energy from the electrical grid during a subsequent plug event. These and other features are discussed in greater detail in the following paragraphs of this detailed description.

Figure 1:
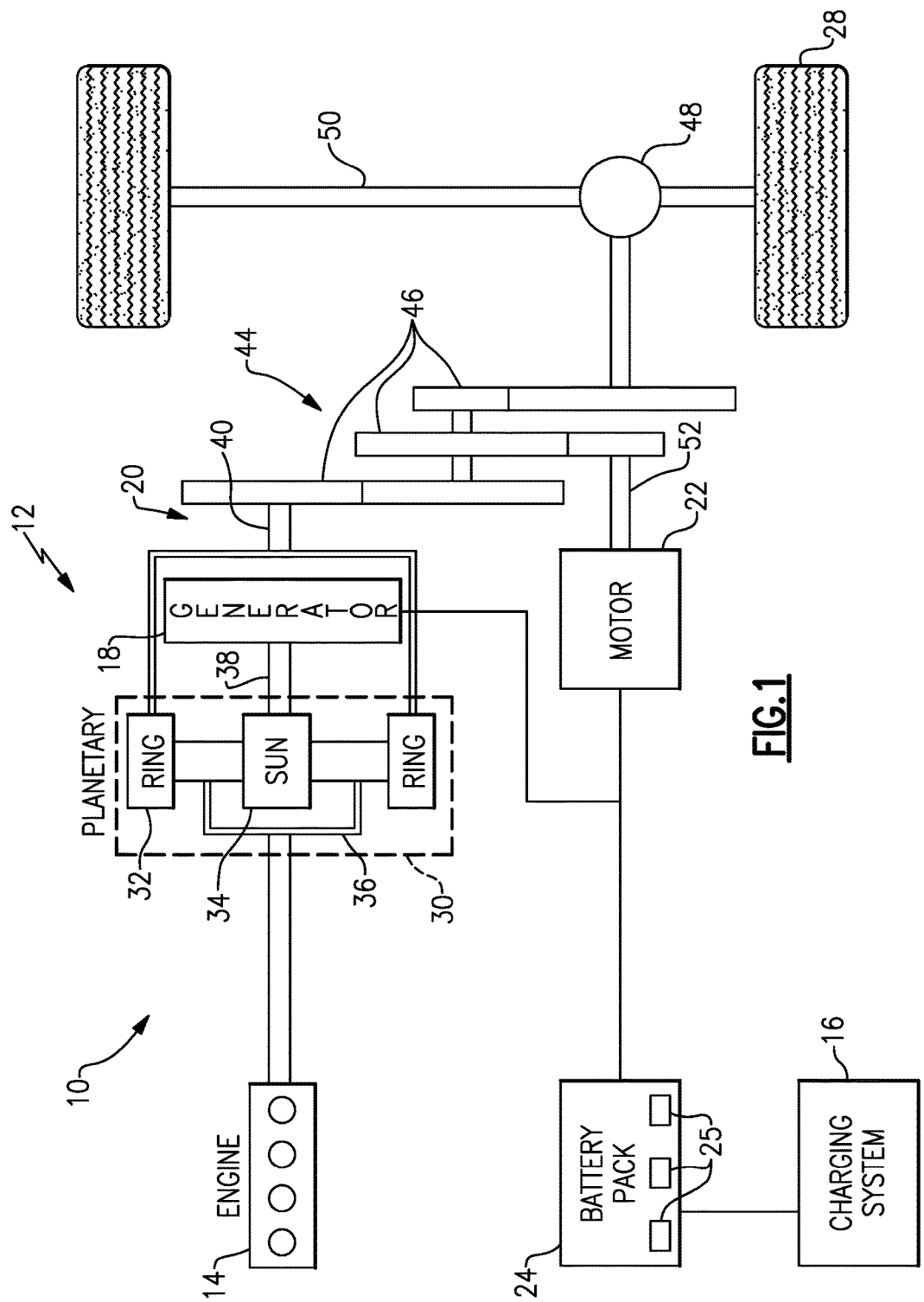
FIG. 1 schematically illustrates a powertrain of an electrified vehicle.

FIG. 1 schematically illustrates a powertrain 10 for an electrified vehicle 12. In one non-limiting embodiment, the electrified vehicle 12 is a plug-in hybrid electric vehicle (PHEV). However, other electrified vehicles could also benefit from the teachings of this disclosure.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 52 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 may also include a charging system 16 for charging the energy storage devices (e.g., battery cells) of the battery pack 24. The charging system 16 may be connected to an external power source (not shown) for receiving and distributing power throughout the vehicle. The charging system 16 may also be equipped with power electronics used to convert AC power received from the external power supply to DC power for charging the energy storage devices of the battery pack 24. The charging system 16 may also accommodate one or more conventional voltage sources from the external power supply (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

Figure 2:
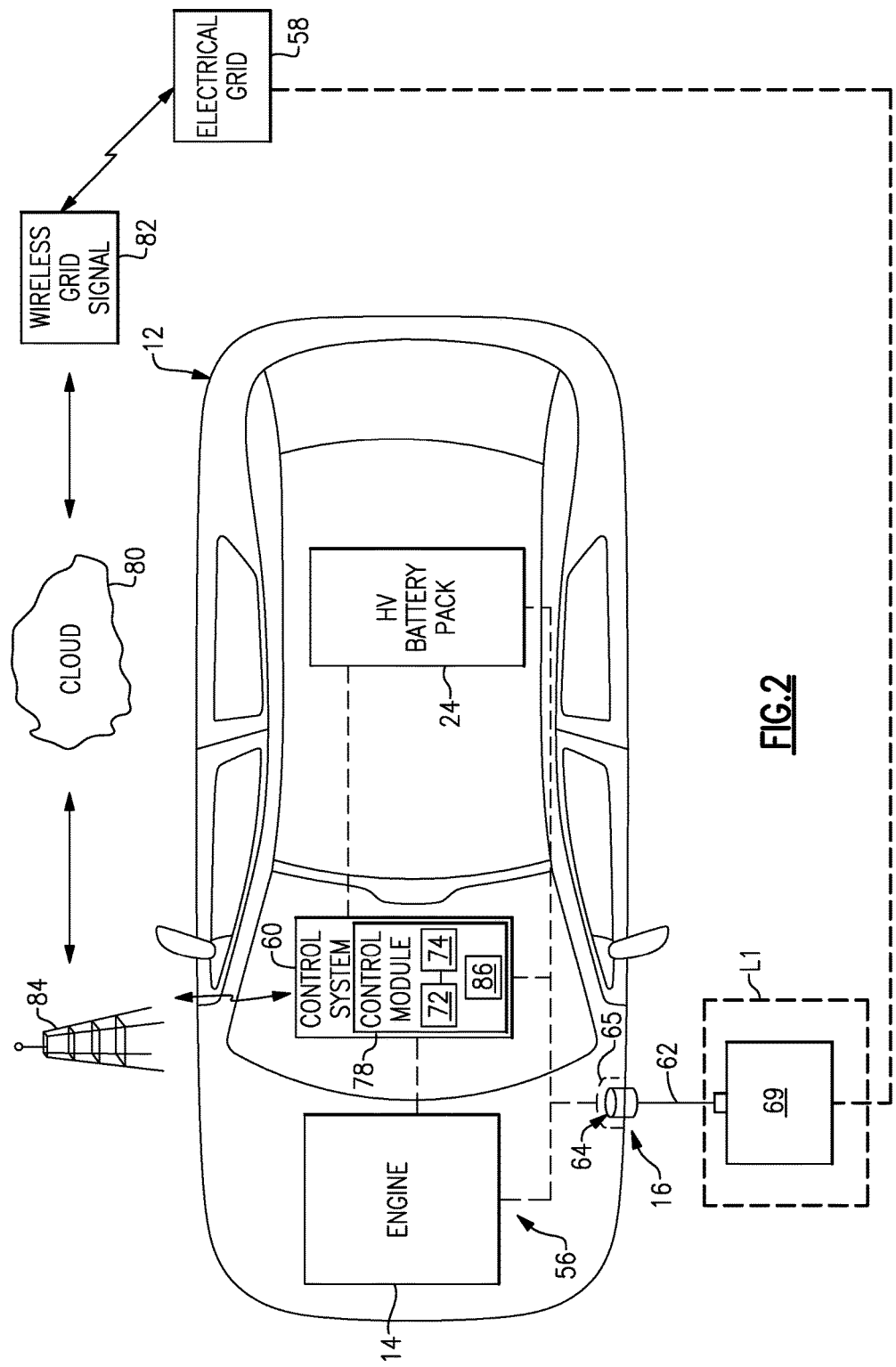
FIG. 2 illustrates a vehicle system of an electrified vehicle.

FIG. 2 is a highly schematic depiction of a vehicle system 56 that may be employed within an electrified vehicle, such as the electrified vehicle 12 of FIG. 1. The various components of the vehicle system 56 are shown schematically to better illustrate the features of this disclosure. These components, however, are not necessarily depicted in the exact locations where they would be found in an actual vehicle.

The vehicle system 56 is adapted to control the electrified vehicle 12 in a manner that benefits an electrical grid 58. For example, it is desirable to balance the energy production of the electrical grid 58 with the energy demanded of the electrical grid 58 by consumers. In one non-limiting embodiment, as further detailed below, operation of the engine 14 of the electrified vehicle 12 may be selectively controlled during a drive event in a manner that influences the electrical grid 58 during a subsequent plug event.

In one non-limiting embodiment, the exemplary vehicle system 56 includes the engine 14, the high voltage battery pack 24, the charging system 16 and a control system 60. The engine 14 may be an internal combustion engine or any other engine. The battery pack 24 may include one or more battery assemblies each having a plurality of battery cells or other energy storage devices. The energy storage devices of the battery pack 24 store electrical energy that is selectively supplied to power various electrical loads residing onboard the electrified vehicle 12. These electrical loads may include various high voltage loads (e.g., electric machines, etc.) or various low voltage loads (e.g., lighting systems, low voltage batteries, logic circuitry, etc.). The energy storage devices of the battery pack 24 are configured to either accept energy from the electrical grid 58 or add energy to the electrical grid 58, as described further below.

The charging system 16 includes a power cord 62 that connects between a charging port 64 of a vehicle connector 65 (located onboard the electrified vehicle 12) and a power outlet 69 that receives power from the electrical grid 58. The power outlet 69 is located at a charging location L1. Exemplary charging locations include but are not limited to a public charging station located along a drive route, a driver's home, or a parking garage. Power from the electrical grid 58 may be selectively transferred between the electrified vehicle 12 and the power outlet 69 via the power cord 62.

The charging system 16 may be equipped with power electronics configured to convert AC power received from the electrical grid 58 to DC power for charging the energy storage devices of the battery pack 24, or for converting the DC power received from the battery pack 24 to AC power for adding energy to the electrical grid 58. The charging system 16 may also be configured to accommodate one or more conventional voltage sources from the power outlet 69. In still other embodiments, the charging system 16 could be a wireless charging system or a DC charging system.

The control system 60 of the vehicle system 56 may control operation of the engine 14 during certain conditions to balance the electrical grid 58. For example, as further discussed below, the control system 60 may adjust operation of the engine 14 to either conserve a state of charge (SOC) of the battery pack 24 or deplete the SOC of the battery pack 24 during a drive event depending on the state of the electrical grid 58. The engine 14 of the electrified vehicle 12 may be commanded ON (e.g., the engine power output may be increased or the engine run time may be increased) during the drive event if the electrical grid 58 has an energy shortage. The battery pack 24 SOC is therefore conserved during the drive event for adding energy to the electrical grid during a subsequent plug event (i.e., when the power cord 62 is plugged into the power outlet 69 or the charging system 16 is otherwise connected to the electrical grid 58). The operation of the engine 14 may alternatively be restricted (e.g., the engine power output is decreased or the engine run time is decreased) during the drive event if the electrical grid 58 has an energy surplus. The battery pack 24 SOC is therefore depleted during the drive event and can be replenished by accepting energy from the electrical grid 58 during a subsequent plug event. The control system 60 may additionally control various other operational aspects of the electrified vehicle 12.

The control system 60 may be part of an overall vehicle control system or could be a separate control system that communicates with the vehicle control system. The control system 60 may include one or more control modules 78 equipped with executable instructions for interfacing with and commanding operation of various components of the vehicle system 56. For example, in one non-limiting embodiment, each of the engine 14, the battery pack 24 and the charging system 16 include a control module, and these control modules can communicate with one another over a controller area network (CAN) to control the electrified vehicle 12. In another non-limiting embodiment, each control module 78 of the control system 60 includes a processing unit 72 and non-transitory memory 74 for executing the various control strategies and modes of the vehicle system 56. One exemplary control strategy is further discussed below with reference to FIG. 3.

The control system 60 of the electrified vehicle 12 may communicate with the electrical grid 58 over a cloud 80 (i.e., the internet). Upon an authorized request, a wireless grid signal 82 may be transmitted to the control system 60. The wireless grid signal 82 includes instructions for controlling the electrified vehicle 12 in order to balance the electrical grid 58. These instructions may be based, at least in part, on whether the electrical grid 58 is likely to experience an energy shortage or an energy surplus at the next expected plug event. In one non-limiting embodiment, the wireless grid signal 82 instructs the control system 60 to adjust the operation of the engine 14 during a drive event to either conserve/increase the SOC of the battery pack 24 (e.g., if energy shortage conditions are expected at next plug event) or deplete the SOC of the battery pack 24 (e.g., if energy surplus conditions are expected at next plug event).

The wireless grid signal 82 may be communicated via a cellular tower 84 or some other known communication technique. The control system 60 includes a transceiver 86 for bidirectional communication with the cellular tower 84. For example, the transceiver 86 can receive the wireless grid signal 82 from the electrical grid 58 or can communicate data back to the electrical grid 58 via the cellular tower 84. Although not necessarily shown or described in this highly schematic embodiment, numerous other components may enable bidirectional communication between the electrified vehicle 12 and the electrical grid 58.

Figure 3:
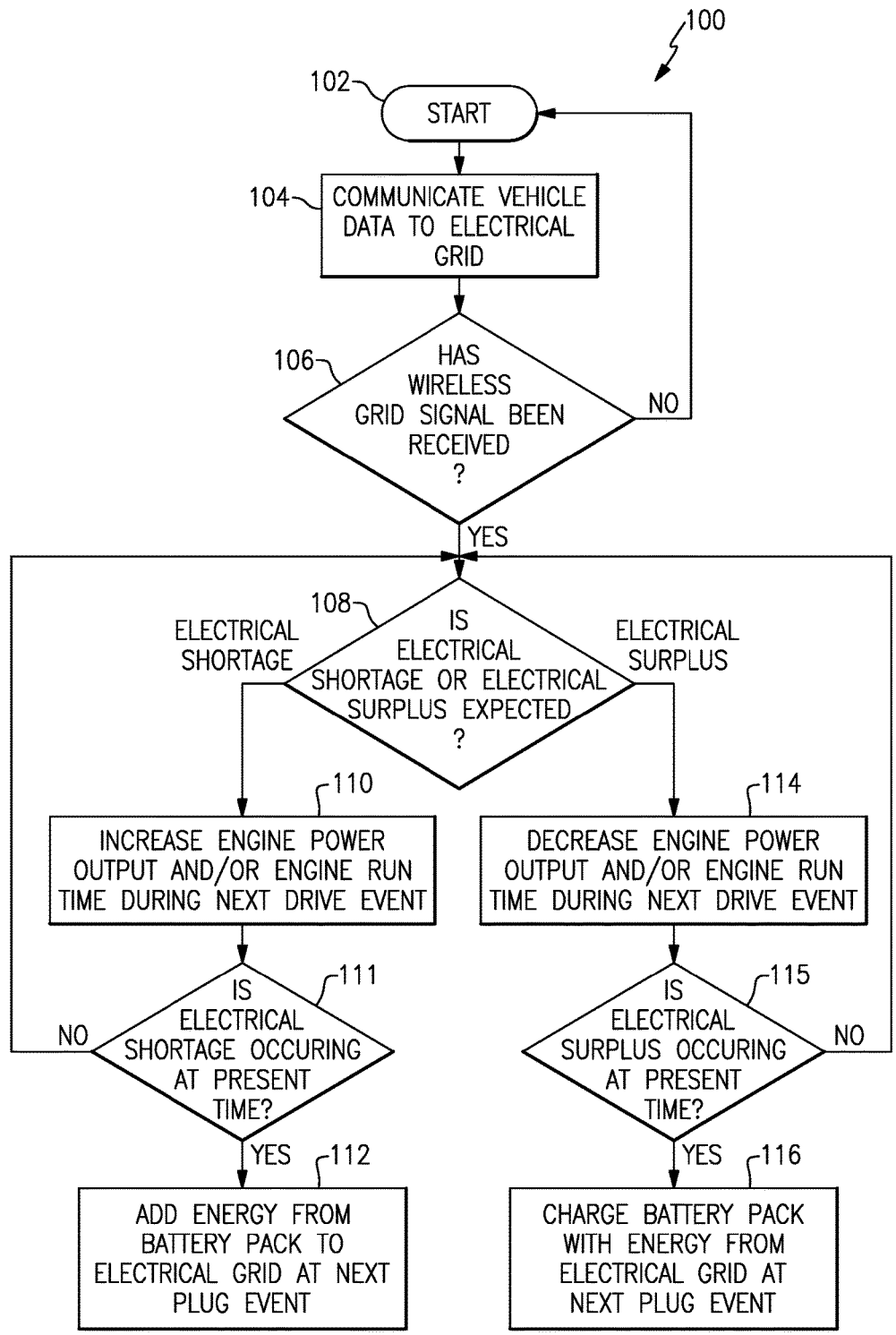
FIG. 3 schematically illustrates a control strategy for controlling an electrified vehicle in a manner that aids in balancing an electrical grid.

FIG. 3, with continued reference to FIGS. 1 and 2, schematically illustrates a control strategy 100 for controlling the vehicle system 56 of the electrified vehicle 12. For example, the control strategy 100 can be performed to control operation of the electrified vehicle 12 in a manner that helps balance the electrical grid 58. In one non-limiting embodiment, the control system 60 of the vehicle system 56 is programmed with one or more algorithms adapted to execute the exemplary control strategy 100, or any other control strategy. In another non-limiting embodiment, the control strategy 100 is stored as executable instructions in the non-transitory memory 74 of the control module 78 of the control system 60.

The control strategy 100 begins at block 102. At block 104, vehicle data associated with the electrified vehicle 12 is collected by the control system 60 and is communicated to the electrical grid 58. The vehicle data may include expected drive routes of the electrified vehicle 12, current and expected SOC's of the battery pack 24 and any other vehicle information. The expected drive route may be inferred based on historical route data associated with a given date, day and time of the week. The drive route could alternatively be determined based on instructions from the user, such as by the user manually entering a specific drive route into a navigation system. The vehicle data can optionally be used by the electrical grid 58. The vehicle data is communicated over the cloud 80 from the electrified vehicle 12 to the electrical grid 58.

The control system 60 of the electrified vehicle 12 determines whether a wireless grid signal 82 has been received from the electrical grid 58 at block 106. The electrical grid 58 may predict whether it is likely to have an energy shortage or an energy surplus at any given date, day and time. These predictions may be based on expected energy demand that may fluctuate based on conditions such as weather affecting the demand for household A/C usage; and compared to, expected energy production from renewable sources, to determine opportunities to optimize the usage and storage of renewable energy in connection with a vehicle battery. The renewable production sources may vary by the sun and wind forecasts. Furthermore, the total energy production of renewable and fossil fuel is compared to the demand to determine if storing or using more vehicle battery can be used to balance transient grid imbalances rather than firing up additional low-efficiency gas generators. The wireless grid signal 82 is based on these predictions and includes instructions for controlling the electrified vehicle 12 to balance the electrical grid 58.

Next, at block 108, the wireless grid signal 82 is analyzed by the control system 60 to determine whether the electrical grid 58 anticipates an energy shortage or an energy surplus at the next expected plug event of the electrified vehicle 12. If an energy shortage is expected, the control strategy 100 proceeds to block 110 and actuates the engine 14 ON so that the engine 14 powers the vehicle drive wheels 28 instead of the battery pack 24. This may include increasing engine power output and/or increasing the engine run time. In this way, the SOC of the battery pack 24 is conserved during the drive event. In another non-limiting embodiment, the power output of the engine 14 can be controlled during block 110 to generate a greater amount of power than is necessary to propel the drive wheels 28 to charge the battery pack 24 to a greater SOC during certain grid conditions, such as extreme grid shortages. After confirming the electrical shortage again at block 111, the conserved energy of the battery pack 24 may be added to the electrical grid to address the energy shortage at block 112 during the next plug event (i.e., the next time the electrified vehicle 12 is on-plug or wirelessly connected to the electrical grid).

Alternatively, if an energy surplus is expected at block 108, the control strategy 100 proceeds to block 114 and minimizes engine 14 operation during the drive event so that the battery pack 24 primarily powers the vehicle drive wheels 28. In this way, the SOC of the battery pack 24 is depleted during the drive event. After confirming the electrical surplus again at block 115, the battery pack 24 can then be charged with power from the electrical grid 58 to address the energy surplus at block 116 during the next plug event.

Figure 4:
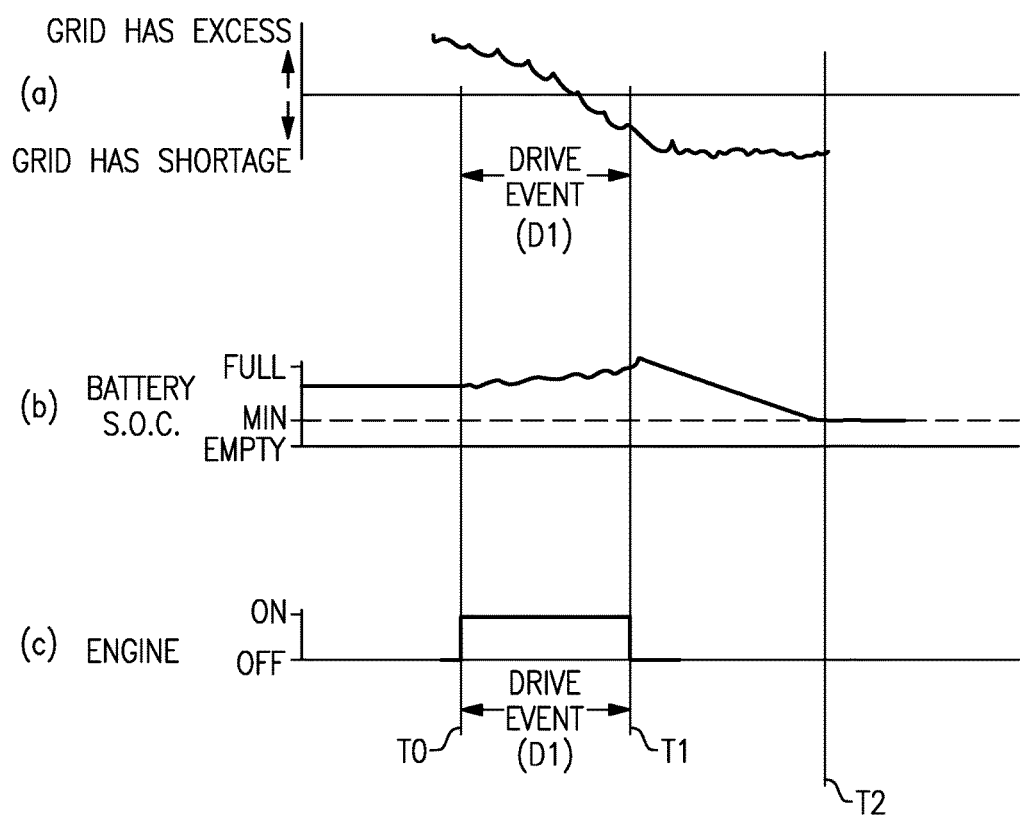
FIGS. 4 and 5 schematically illustrate exemplary implementations of the control strategy illustrated in FIG. 3.
Figure 5:
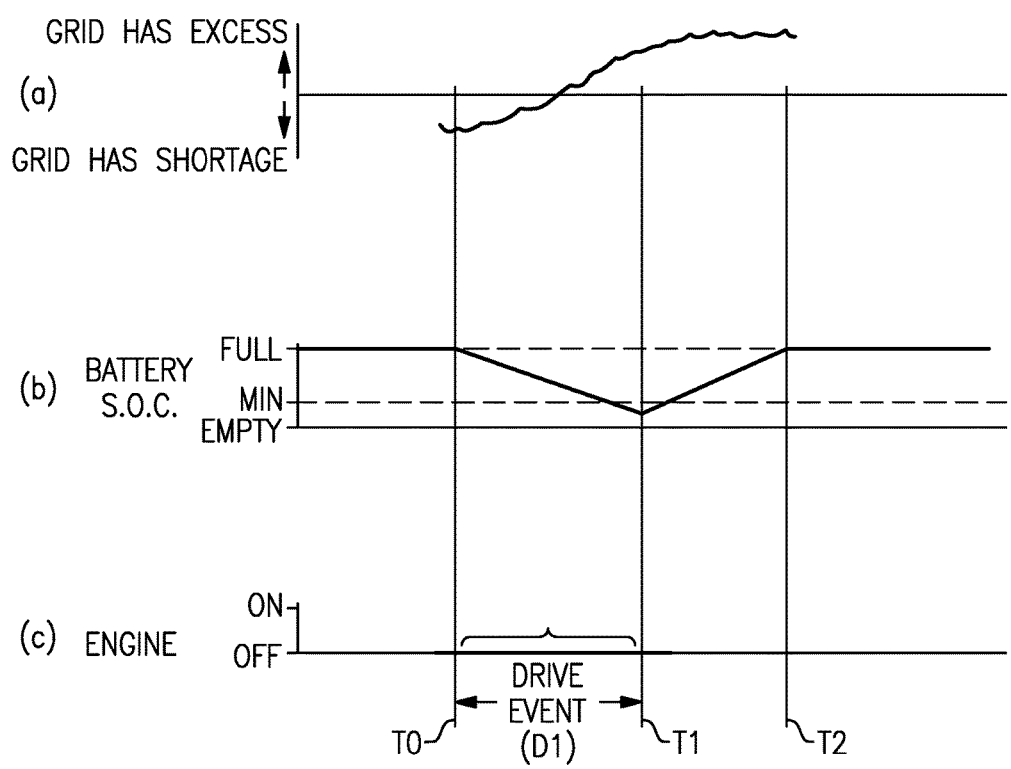

FIGS. 4 and 5 graphically illustrate exemplary implementations of the control strategy 100 described by FIG. 3. These examples are provided for illustrative purposes only, and therefore, the specific values and parameters indicated in these figures are not intended to limit this disclosure in any way.

FIG. 4 illustrates a first grid condition in which an electrical grid shortage is expected at a time T1 of the next expected plug event of the electrified vehicle 12 (see graph (a)). To address such a shortage, the engine 14 of the electrified vehicle is commanded ON (see graph (c)) at time T0 which marks the beginning of a drive event D1 to conserve the SOC of the battery pack 24 during the drive event D1. The battery pack 24 SOC stays relatively consistent during the drive event D1 (see graph (b)). Therefore, during a time period between the time T1 and a time T2, the electrical grid 58 is able to draw power from the battery pack 24 to help balance the electrical grid 58 (see graph (b)).

FIG. 5 illustrates a second grid condition in which an electrical grid surplus is expected at the time T1 of the next expected plug event of the electrified vehicle 12 (see graph (a)). To address such a surplus, operation of the engine 14 of the electrified vehicle 12 is restricted during the drive event D1 and engine start commands are inhibited (see graph (c)) to maximize battery pack 24 usage during the drive event D1. The battery pack 24 SOC is depleted during the drive event D1 (see graph (b)). Therefore, during a time period between the times T1 and T2, the electrical grid 58 is able to send needed power for replenishing the SOC of the battery pack 24 to help balance the electrical grid 58 (see graph (b)).

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method for balancing electrical grid production with electrical grid demand, comprising:
   adjusting operation of an engine of an electrified vehicle during a drive event to either conserve or increase a state of charge of a battery pack in response to a first grid condition of an electrical grid or deplete the state of charge of the battery pack in response to a second grid condition of the electrical grid.

2. The method as recited in claim 1, wherein the first grid condition is an energy shortage of the electrical grid and the second grid condition is an energy surplus of the electrical grid.

3. The method as recited in claim 2, comprising adding power from the battery pack to the electrical grid at next plug event if the electrical grid has the energy shortage.

4. The method as recited in claim 2, comprising accepting power from the electrical grid to charge the battery pack at next plug event if the electrical grid has the energy surplus.

5. The method as recited in claim 1, comprising:
   communicating vehicle data to the electrical grid prior to the adjusting step, the first grid condition and the second grid condition determined at least partially based on the vehicle data.

6. The method as recited in claim 5, wherein the first grid condition and the second grid condition are additionally determined based at least on a weather forecast.

7. The method as recited in claim 1, comprising:
   confirming whether a wireless grid signal has been received by the electrified vehicle from the electrical grid.

8. The method as recited in claim 7, comprising:
   determining whether the wireless grid signal indicates an energy shortage or an energy surplus.

9. The method as recited in claim 8, wherein, if the wireless grid signal indicates an energy shortage, the adjusting step includes:
   increasing a power output of the engine or increasing a run time of the engine during the drive event.

10. The method as recited in claim 9, comprising:
    adding energy from the battery pack to the electrical grid at next plug event to address the energy shortage.

11. The method as recited in claim 8, wherein, if the wireless grid signal indicates an energy surplus, the adjusting step includes:
    decreasing a power output of the engine or decreasing a run time of the engine during the drive event.

12. The method as recited in claim 11, comprising:
    charging the battery pack using energy from the electrical grid at next plug event.

13. The method as recited in claim 1, comprising:
    actuating the engine ON during the drive event in response to an energy shortage condition of the electrical grid.

14. The method as recited in claim 1, comprising:
    decreasing a power output of the engine or decreasing a run time of the engine during the drive event in response to an energy surplus condition of the electrical grid.

15. The method as recited in claim 1, wherein the electrified vehicle is a plug-in hybrid electric vehicle.

16. An electrified vehicle, comprising:
    a set of drive wheels;
    a battery pack configured to selectively power said drive wheels;
    an engine configured to selectively power said drive wheels; and
    a control system configured with instructions for adjusting operation of said engine during a drive event based on grid conditions of an electrical grid for balancing said-electrical grid.

17. The electrified vehicle as recited in claim 16, wherein said control system is configured to receive a wireless grid signal from said electrical grid, said wireless grid signal including said instructions.

18. The electrified vehicle as recited in claim 16, comprising a charging system configured to connect said battery pack to said electrical grid.

19. The electrified vehicle as recited in claim 16, wherein said control system is configured to run said engine during an energy shortage condition of said electrical grid and restrict operation of said engine during an energy surplus condition of said electrical grid.

20. The electrified vehicle as recited in claim 16, wherein said control system includes a transceiver configured to communicate with said electrical grid over a cloud.

21. A method, comprising:
    adjusting operation of an engine of an electrified vehicle to conserve or increase a state of charge of a battery pack, including:
       increasing a power output or run time of the engine during a drive event in response to an energy shortage of an electrical grid; and
       decreasing the power output or the run time of the engine during the drive event in response to an energy surplus of the electrical grid.

* * * * *

UNITED STATES PATENT AND TRADEMARK OFFICE
CERTIFICATE OF CORRECTION

PATENT NO. : 10,164,433 B2
APPLICATION NO. : 15/000312
DATED : December 25, 2018
INVENTOR(S) : Kenneth James Miller, Douglas Raymond Martin and Jimmy Kapadia It is certified that error appears in the above-identified patent and that said Letters Patent is hereby corrected as shown below:

In the Claims

In Claim 16, Column 10, Line 25; replace "said-electrical grid" with --said electrical grid--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*